United States Patent [19]

Grawey

[11] Patent Number: 4,534,394
[45] Date of Patent: Aug. 13, 1985

[54] WHEEL ASSEMBLY HAVING SELF-CONTAINED TIRE MOUNTING CAPABILITY

[75] Inventor: Charles E. Grawey, Peoria, Ill.

[73] Assignee: Caterpillar Tractor Co., Peoria, Ill.

[21] Appl. No.: 494,200

[22] Filed: May 13, 1983

[51] Int. Cl.³ .................. B60B 21/10; B60B 21/12; B60C 7/24
[52] U.S. Cl. .................................... 152/396; 152/386
[58] Field of Search .................. 152/379.3, 396, 397, 152/399, 400, 401, 375, 386; 301/100, 101, 14, 15, 11 R, 18, 19, 20

[56] References Cited

U.S. PATENT DOCUMENTS

| | | |
|---|---|---|
| 1,530,425 | 3/1925 | Sikora ............................ 301/20 |
| 1,901,759 | 3/1933 | Maranville . | |
| 2,709,471 | 5/1955 | Smith et al. ................. 152/396 |
| 3,877,504 | 4/1975 | Grawey et al. ............. 152/379.3 |
| 3,998,258 | 12/1976 | Grawey et al. . | |
| 4,440,209 | 4/1984 | Grob ............................ 152/399 |

FOREIGN PATENT DOCUMENTS 0551749  4/1923  France ........................... 301/11 R Primary Examiner—David A. Scherbel
Assistant Examiner—Dennis C. Rodgers
Attorney, Agent, or Firm—John W. Grant

[57] ABSTRACT

A wheel assembly (10) having self-contained tire mounting and demounting capabilities includes a closed torus tire (18) mountable on a wheel rim (11). The tire (18) is forced onto the wheel rim (11) by a plurality of retainers (25) which are driven into a plurality of mating slots (13) in the wheel rim by bolts (31). Similarly, the tire is forced off of the rim by screwing the bolts through threaded apertures in the retainers and against the wheel rim. Thus, the tire can be demounted from the wheel rim and that tire or another tire can be mounted on the wheel rim without removing the wheel rim from the vehicle.

4 Claims, 8 Drawing Figures

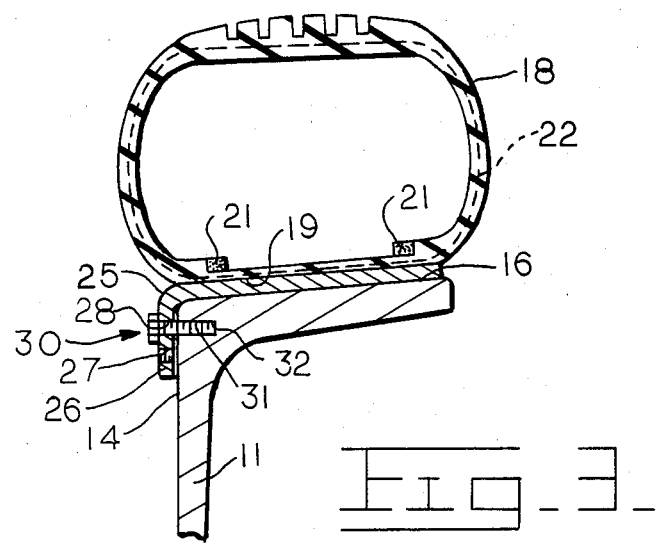
Fig_3_
Fig_4_
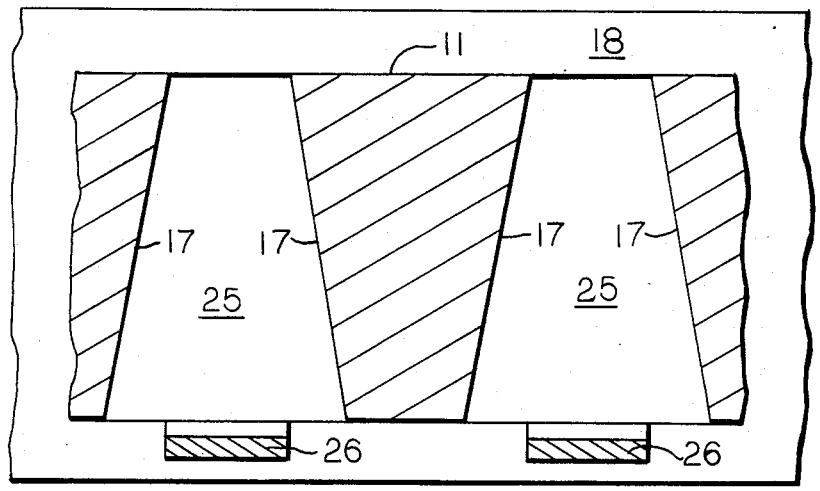

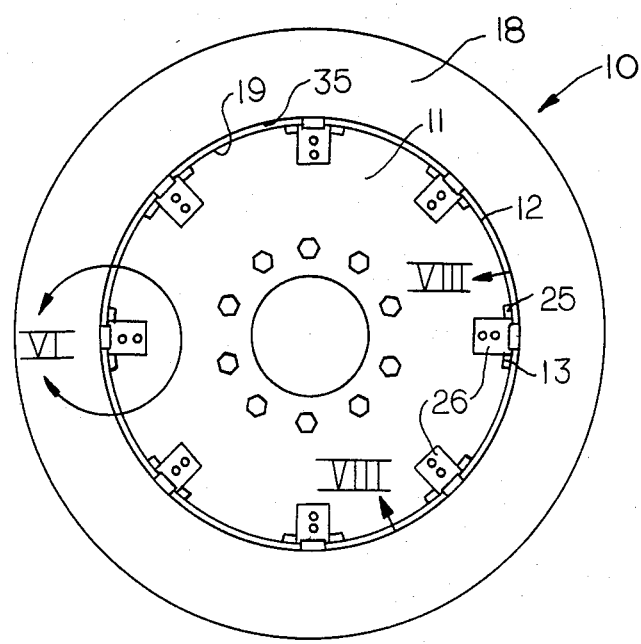
Fig_5_
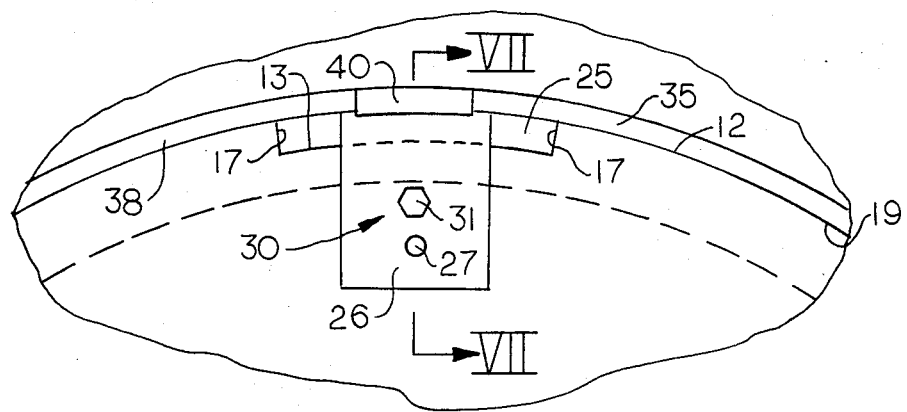
Fig_6_

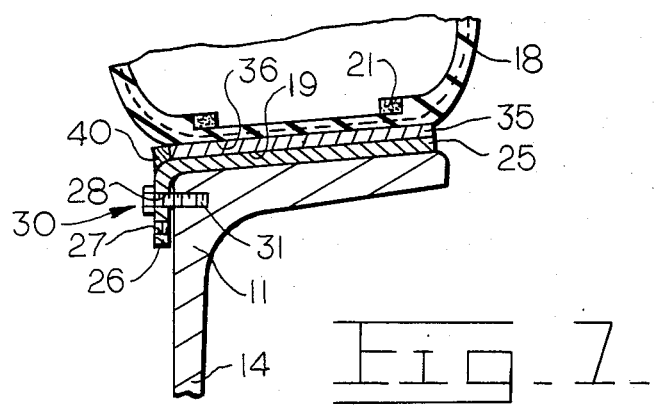
Fig. 7.
Fig. 8.
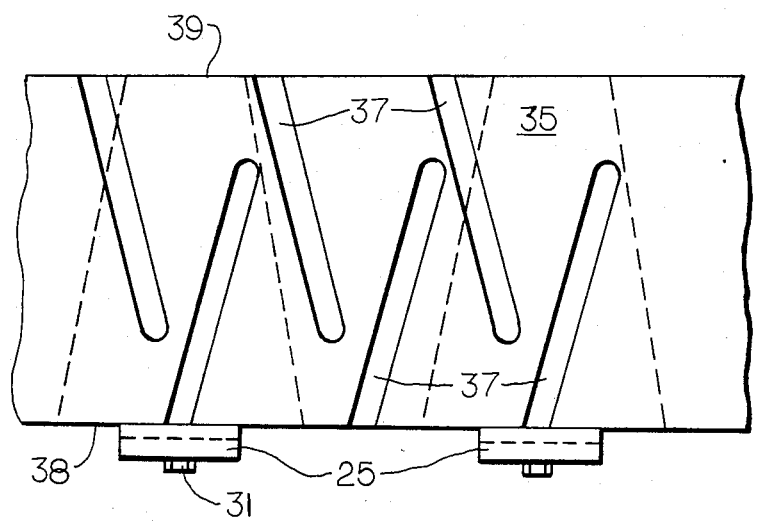

WHEEL ASSEMBLY HAVING SELF-CONTAINED TIRE MOUNTING CAPABILITY

DESCRIPTION

1. Technical Field

This invention relates generally to a wheel assembly and more particularly to a wheel assembly having a self-contained tire mounting/demounting device.

2. Background Art

The wheels of many large airplanes have the brakes and associated apparatus connected thereto to form an integrated wheel assembly package. One of the problems associated therewith is that of replacing a tire on the wheel rim. With the present commercially available tires, it is generally necessary to remove the wheel from the airplane before the tire can be demounted from the wheel rim. However, in order to remove the wheel, the brakes and associated apparatus must first be disconnected from the airplane. Disconnecting the brake and associated apparatus and the subsequent reconnection thereof greatly increases the man hours required for replacing the tire. Moreover, since it is common practice to have spare wheel assemblies with tires mounted thereon, such spares must also have the brake related components mounted thereto which thereby increases the cost of maintaining an inventory of spares.

The present invention is directed to overcoming one or more of the problems as set forth above.

DISCLOSURE OF THE INVENTION

In one aspect of the present invention, a wheel assembly includes a rim which has a tire receiving surface and a plurality of axially extending notches recessed into the tire receiving surface. A closed torus tire is mounted on the rim and has an inner rim surface mated with the tire receiving surface of the rim. A plurality of retainers extend into the notches and are adapted to provide a driving connection between the tire and rim. A means is provided for driving each of the retainers into the notches and establishing said driving connection between the tire and rim.

The present invention provides a wheel assembly having self-contained tire mounting and demounting capabilities using simple tools normally found in a mechanic's tool box. This permits the tire to be removed from the wheel rim and subsequently reinstalled thereon without removing the wheel from the vehicle such as an airplane. The mechanism for mounting and demounting the tire also establishes the driving connection between the tire and rim.

BRIEF DESCRIPTION OF THE DRAWINGS

FIG. 3 is a cross-sectional view taken along line III—III of FIG. 2;

FIG. 4 is a sectional view taken along line IV—IV of FIG. 1;

FIG. 5 is a side elevational diagrammatic view of another embodiment of the present invention;

FIG. 6 is a somewhat enlarged fragmentary view of a portion of the embodiment of FIG. 5;

FIG. 7 is a cross-sectional view taken along line VII—VII of FIG. 6; and

FIG. 8 is a sectional view taken along line VIII—VIII of FIG. 5.

BEST MODE FOR CARRYING OUT THE INVENTION

Figure 1:
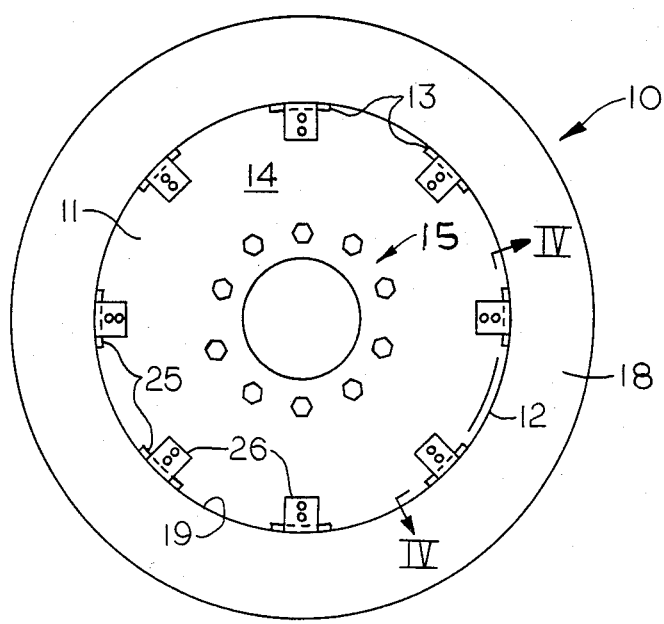
FIG. 1 is a side elevational diagrammatic view of an embodiment of the present invention.
Figure 2:
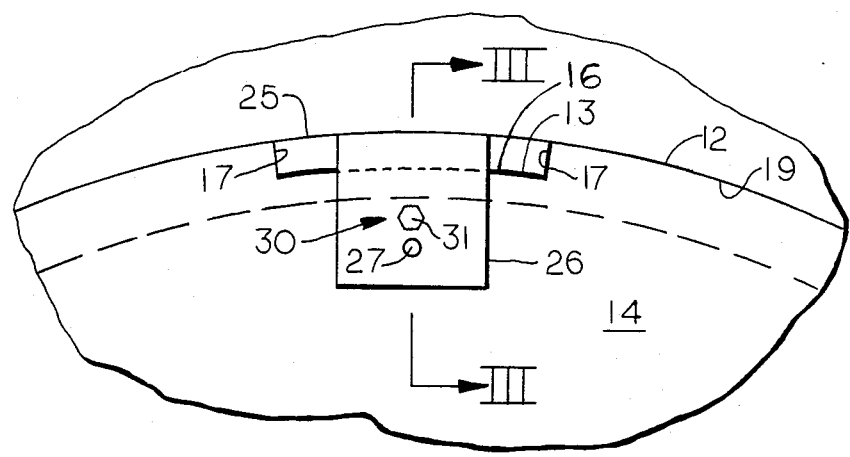
FIG. 2 is a somewhat enlarged fragmentary portion of the embodiment of FIG. 1.

Referring now to FIGS. 1–4, a wheel assembly is generally indicated by the reference numeral 10 and includes a wheel rim 11. The wheel rim 11 has a tire receiving surface 12 and a plurality of axially extending slots 13 recessed into the tire receiving surface 12. An axial end portion 14 of the wheel rim 11 extends radially inwardly and has a means 15 for mounting the wheel to a vehicle, not shown, formed therein. The tire receiving surface 12 is a frusto-conical surface which has its smallest circumference at the axial end portion 14. Each of the slots 13 has a bottom surface 16 concentric with the tire receiving surface 12 and a pair of converging side surfaces 17.

A closed torus tire 18 is mounted on the wheel rim 11 and has an inner rim surface 19 positioned on the tire receiving surface 12 of the wheel rim. The inner rim surface 19 is a frusto-conical surface concentric with the tire receiving surface 12. However, the free state circumference of the inner rim surface 19 of the tire is preferably slightly less than the circumference of the tire receiving surface 12 so that an interference fit is provided when the tire 18 is mounted on the wheel rim 11. The tire includes a pair of spaced apart roll restraining hoops 21 and a radial reinforcing ply 22.

A plurality of retainers 25 extend into the slots 13 and are suitably bonded to the inner rim surface 19 of the tire 18 as an integral part thereof. Each of the retainers 25 has a tang 26 extending radially inwardly adjacent the axial end portion 14 of the wheel rim 11. A threaded aperture 27 and a non-threaded aperture 28 extend through the tang 26.

A means 30 is provided for driving each of the retainers into the slots 13 for establishing a driving connection between the closed torus tire 18 and the wheel rim 11. The means 30 can include, for example, a plurality of bolts 31 extending through the aperture 28 in the tangs 26 and threaded into a plurality of threaded apertures 32 in the axial end portion 14 of the wheel rim 11.

An alternate embodiment of a wheel assembly 10 of the present invention is disclosed in FIGS. 5–8. It is noted that the same reference numerals of the first embodiment are used to designate similarly constructed counterpart elements of this embodiment. In this embodiment, however, an expandable metallic band 35 is bonded to an inner surface 36 of the closed torus tire 18 such that the inner rim surface 19 is now the inner surface of the metallic band. The band 35 is expandable by virtue of a plurality of notches 37 extending inwardly from both edges 38,39 of the band. The retainers 25 are separate pieces and have a radially outwardly extending lip 40 for engagement with the edge 38 of the band.

INDUSTRIAL APPLICABILITY

In use the present invention permits the closed torus tire 18 to be mounted on or demounted from the wheel rim 11 while the wheel rim 11 remains connected to a vehicle such as an aircraft, not shown. Demounting of the tire from the assembled position shown by the drawings is initiated by removing the bolts 32 and then reinserting them into the threaded apertures 27 in the tangs 26 of the retainers 25. Subsequent rotation of the bolts 32 causes them to engage the axial end portion 14 of the wheel rim causing the retainers 25 and hence the tire 18 to be moved leftwardly as viewed in FIG. 3. Since the mating surfaces of the various components are tapered, the compressive force created between the roll hoops 21 of the tire 18, the retainers 25 and the wheel rim 11 created when the tire was mounted on the rim diminishes rapidly. Preferably, the degree of taper of the elements and length of the bolts 31 are selected so that the tire is freed from frictional connection with the wheel rim prior to the bolts being fully threaded into the threaded apertures. Thus the tire 18 can be easily removed from the wheel rim.

Mounting a closed torus tire 18 to the wheel rim 11 is initiated by positioning the tire 18 on the wheel rim 11 with the retainers 25 positioned in the slots 13. With the tire receiving surface 12 and the inner rim surface 19 both being tapered, the tire can be positioned on the rim with minimal effort sufficient for inserting the bolts 32 through the non-threaded aperture 28 in the tang 26 of the retainers 25 and partially threaded into the threaded apertures 32 in the wheel rim 11. The bolts 32 are then screwed into the threaded apertures in a predetermined pattern thereby driving the retainers 25 into the slots 13. The relative size of the tire receiving surface 12, inner rim surface 19, and the thickness of the retainers 25 is selected so that a high compressive force is generated between the retainers 25 and the inextensible roll hoops 21. This compressive force greatly enhances the mechanical driving connection between the tire and rim created by the keyed connection between the retainers 25 and the slots 13.

The primary difference between the demounting procedure of the alternate embodiment shown in FIGS. 5-8 is that once the tire 18 is freed from the wheel rim 11 the separate retainers 25 are removed from the slots 13 prior to the tire 18 being removed from the wheel rim 11. Likewise, the primary difference in the mounting procedure is that the tire 18 is first positioned on the wheel rim 11 and then the separate retainers 25 are individually inserted into the slots 13 in the wheel rim 11. The driving connection between the tire and wheel rim is established by driving the retainers into the slots in the manner previously described.

While the driving connection between the tire 18 and wheel rim 11 of the embodiment of FIGS. 5-8 is dependent only upon compressive frictional contact established by the tapered surfaces of the mating components, a keyed effect can be obtained from this arrangement by providing one or more notches in the edge 28 for receiving the lip 40 of the associated retainers 25.

In view of the foregoing, it is readily apparent that the structure of the present invention provides an improved wheel assembly having self-contained tire mounting capabilities for permitting the tire to be mounted on or demounted from a wheel with the wheel remaining on the vehicle and by using conventional mechanic's tools. This is accomplished through the use of the plurality of retainers which are driven into the mating slots in the wheel rim by bolts threaded into threaded holes in the wheel rim. With the mating surfaces having matching tapers, driving the retainers into the slots establishes the driving connection between the tire and rim.

Other aspects, objects and advantages of this invention can be obtained from a study of the drawings, the disclosure and the appended claims.

I claim:

1. A wheel assembly (10) comprising:
   a wheel rim (11) having a tire receiving surface (12) and a plurality of axially extending slots (13) recessed into the tire receiving surface (12), said tire receiving surface being defined solely by a single frusto-conical surface;
   a closed torus tire (18) mounted on the wheel rim (11) and having an inner rim surface (19) defined solely by a single frusto-conical surface, said inner rim surface being mated with the tire receiving surface (12) of the wheel rim (11);
   a plurality of retainers (25) extending into the slots (13) and adapted to provide a driving connection between the tire (18) and wheel rim (11); and
   means (30) for driving each of the retainers (25) into the slots (13) for establishing said driving connection between the tire and rim.

2. The wheel assembly (10) as set forth in claim 1 wherein said retainers (25) are bonded to the inner rim surface (19) of the tire (18) as an integral part thereof.

3. The wheel assembly (10) as set forth in claim 1, wherein said tire (18) includes an expandible metal band formed as an integral part thereof, said band having an inner surface which forms the inner rim surface of said tire.

4. A wheel assembly comprising:
   a wheel rim (11) having a frusto-conical tire receiving surface (12) and a plurality of axially extending slots (13) recessed into the tire receiving surface;
   a closed torus tire (18) mounted on the wheel rim and having a frusto-conical inner rim surface (19) mated with the tire receiving surface of the wheel rim;
   a plurality of retainers (25) bonded to the inner rim surface (19) of the tire as an integral part thereof and extending into the slots of the wheel rim to provide a driving connection between the tire and wheel rim; and
   means (30) for driving each of the retainers (25) into the slots for establishing said driving connection between the tire and rim.

* * * * *